(12) United States Patent
Chapman et al.

(10) Patent No.: US 9,313,095 B2
(45) Date of Patent: Apr. 12, 2016

(54) MODULAR HEADEND ARCHITECTURE WITH DOWNSTREAM MULTICAST

(75) Inventors: John T. Chapman, Laguna Niguel, CA (US); Sangeeta Ramakrishnan, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 150 days.

(21) Appl. No.: 13/611,062

(22) Filed: Sep. 12, 2012

(65) Prior Publication Data

US 2013/0070765 A1    Mar. 21, 2013

Related U.S. Application Data

(60) Provisional application No. 61/535,715, filed on Sep. 16, 2011, provisional application No. 61/536,726, filed on Sep. 20, 2011, provisional application No. 61/565,102, filed on Nov. 30, 2011, provisional application No. 61/608,977, filed on Mar. 9, 2012.

(51) Int. Cl.
| | | |
|---|---|---|
| H04L 12/24 | (2006.01) |
| H04N 21/647 | (2011.01) |
| H04L 12/28 | (2006.01) |
| H04N 21/258 | (2011.01) |
| H04N 21/61 | (2011.01) |
| H04N 21/643 | (2011.01) |
| H04L 29/12 | (2006.01) |
| H04N 21/222 | (2011.01) |

(52) U.S. Cl.
CPC ........ *H04L 41/0803* (2013.01); *H04L 12/2801* (2013.01); *H04L 12/2863* (2013.01); *H04L 61/2015* (2013.01); *H04N 21/2221* (2013.01); *H04N 21/25816* (2013.01); *H04N 21/6118* (2013.01); *H04N 21/6168* (2013.01); *H04N 21/64322* (2013.01); *H04N 21/64707* (2013.01)

(58) Field of Classification Search
None
See application file for complete search history.

(56) References Cited

U.S. PATENT DOCUMENTS

| | | | |
|---|---|---|---|
| 6,728,239 B1 | 4/2004 | Kung et al. |
| 6,751,230 B1 | 6/2004 | Vogel et al. |
| 6,907,067 B1 | 6/2005 | Moeller et al. |
| 7,089,580 B1 | 8/2006 | Vogel et al. |
| 7,209,442 B1 | 4/2007 | Chapman |

(Continued)

FOREIGN PATENT DOCUMENTS

WO    0119080    3/2001

OTHER PUBLICATIONS

International Search Report and Written Opinion in counterpart International Application No. PCT/US2012/054767, mailed Jan. 9, 2013.

(Continued)

*Primary Examiner* — Joshua A Kading
(74) *Attorney, Agent, or Firm* — Edell, Shapiro & Finnan, LLC

(57) ABSTRACT

Techniques are provided for enabling multicast traffic for a Cable Modem Termination System (CMTS) Modular Headend Architecture (MHA) system. The techniques allow a single modular CMTS core Media Access Control (MAC) domain to service a plurality of physical layer devices. When combined with an independent control plane, Downstream External physical layer (PHY) Interface (DEPI), and Upstream External physical layer (PHY) Interface (UEPI), a downstream PHY device becomes a completely independent and scalable network element.

21 Claims, 9 Drawing Sheets

(56) References Cited

U.S. PATENT DOCUMENTS

| | | | |
|---|---|---|---|
| 7,639,617 B2 | 12/2009 | Chapman et al. | |
| 7,688,828 B2 | 3/2010 | Chapman et al. | |
| 7,701,951 B2 | 4/2010 | Chapman et al. | |
| 7,720,002 B1 | 5/2010 | Beser | |
| 2002/0048268 A1 | 4/2002 | Menon et al. | |
| 2003/0125021 A1 | 7/2003 | Tell et al. | |
| 2003/0126610 A1* | 7/2003 | Ando | 725/91 |
| 2004/0181811 A1* | 9/2004 | Rakib | 725/122 |
| 2005/0024308 A1 | 2/2005 | Ishiyama | |
| 2005/0265398 A1 | 12/2005 | Chapman et al. | |
| 2006/0168612 A1* | 7/2006 | Chapman et al. | 725/11 |
| 2006/0271988 A1 | 11/2006 | Chapman et al. | |
| 2007/0180483 A1 | 8/2007 | Popoviciu | |
| 2007/0195824 A9* | 8/2007 | Chapman et al. | 370/490 |
| 2007/0206607 A1* | 9/2007 | Chapman et al. | 370/395.52 |
| 2008/0049621 A1 | 2/2008 | McGuire et al. | |
| 2008/0094328 A1 | 4/2008 | Ishiyama | |
| 2008/0134262 A1 | 6/2008 | Jung et al. | |
| 2008/0165947 A1 | 7/2008 | Wang et al. | |
| 2009/0016218 A1 | 1/2009 | Hong et al. | |
| 2009/0049492 A1 | 2/2009 | Pantelias | |
| 2009/0177820 A1 | 7/2009 | Ranade et al. | |
| 2010/0002719 A1 | 1/2010 | Sowinski et al. | |
| 2010/0014531 A1 | 1/2010 | Pirbhai et al. | |
| 2010/0154018 A1 | 6/2010 | Cho et al. | |
| 2010/0177784 A1 | 7/2010 | Asati et al. | |
| 2010/0232638 A1 | 9/2010 | Leprince et al. | |
| 2010/0254386 A1 | 10/2010 | Salinger et al. | |
| 2010/0293264 A1 | 11/2010 | Ramsay | |
| 2011/0058491 A1 | 3/2011 | Hsu et al. | |
| 2011/0078755 A1 | 3/2011 | Dai | |
| 2011/0154424 A1* | 6/2011 | Lee | 725/110 |
| 2011/0302600 A1 | 12/2011 | Kelsen et al. | |
| 2012/0178413 A1 | 7/2012 | Schliesser et al. | |
| 2012/0321315 A1 | 12/2012 | Timm et al. | |
| 2013/0051225 A1 | 2/2013 | Pullen | |
| 2013/0177023 A1 | 7/2013 | Salinger et al. | |
| 2014/0143818 A1 | 5/2014 | Nielsen et al. | |

OTHER PUBLICATIONS

CableLabs, "EQAM Architectural Overview Technical Report," Data-Over-Cable Service Interface Specifications, Modular Headend Architecture, Dec. 9, 2008, pp. 1-39.

Office Action issued in European Application No. 12768947.9, dated Apr. 15, 2015, 5 pages.

CableLabs, "Operations Support System Interface Specification," Data-Over-Cable Service Interface Specifications, Converged Cable Access Platform, Aug. 9, 2012, pp. 1-402.

CableLabs, "Downstream External PHY Interface Specification," Data-Over-Cable Service Interface Specifications, Modular Headend Architecture, Jun. 11, 2010, pp. 1-152.

Modbus-IDA, "Modbus Application Protocol Specification V1.1b," http://www.Modbus-IDA.org, Dec. 28, 2006, pp. 1-51.

* cited by examiner

800

A CONTROL PLANE MESSAGE IS SENT FROM A CABLE MODEM TERMINATION SYSTEM (CMTS) COMPRISING INFORMATION CONFIGURED TO PROVIDE MULTICAST ADDRESS INFORMATION TO PLURALITY OF PHYSICAL LAYER DEVICES — 810

AN ACKNOWLEDGEMENT MESSAGE IS RECEIVED FROM ONE OR MORE OF THE PLURALITY OF PHYSICAL LAYER DEVICES — 820

MULTICAST TRAFFIC IS SENT TO THE PLURALITY OF PHYSICAL (PHY) LAYER DEVICES — 830

SENDING A PLURALITY OF MULTICAST STREAMS TO THE PLURALITY OF PHY LAYER DEVICES USING A PLURALITY MAC LAYERS ASSOCIATED WITH THE CMTS, THEREBY ENABLING THE PHY LAYER DEVICES TO SELECTIVELY SUBSCRIBE TO MULTICAST STREAMS BASED ON THE CONTROL PLANE MESSAGE — 840

ARRANGING THE PLURALITY OF MULTICAST STREAMS INTO A MULTICAST GROUP COMPRISING A DOCSIS SERVICE GROUP — 850

FIG.8

MODULAR HEADEND ARCHITECTURE WITH DOWNSTREAM MULTICAST

This application claims the benefit of U.S. Provisional Application No. 61/535,715, filed Sep. 16, 2011; U.S. Provisional Application No. 61/536,726, filed Sep. 20, 2011; U.S. Provisional Application No. 61/565,102, filed Nov. 30, 2011; and U.S. Provisional Application No. 61/608,977, filed Mar. 9, 2012, which are incorporated herein by reference in their entireties.

TECHNICAL FIELD

The present disclosure relates to sending downstream Data-Over-Cable Service Interface Specification (DOCSIS) or MPEG video to a plurality of physical layer devices via multicast.

BACKGROUND

DOCSIS is a protocol that is used to send digital video and data between a hub or headend facility (HEF), and a cable modem (CM), gateway, or a set-top box at a customer premise. DOCSIS originates and terminates via a cable modem termination system (CMTS) at one end and a CM at the other end. For downstream and upstream transport, the digital data are modulated onto a Radio Frequency (RF) carrier or channel using Quadrature Amplitude Modulation (QAM) techniques. There are two types of CMTS architectures: 1) a CMTS with an integrated physical (PHY) layer and 2) a CMTS with a distributed PHY, e.g., on a separate PHY shelf collocated with the CMTS or a remote PHY that is further downstream and closer to the customer's end equipment. The CMTS with a distributed architecture is referred to as a modular CMTS (M-CMTS). In this context a PHY refers to the physical modulation and upconverter technology, and is sometimes referred to as a coaxial media converter (CMC) or an optical coaxial unit (OCU).

To facilitate some markets, a third CMTS architecture has been specified by the cable industry's governing body, CableLabs® that supports conventional video in addition to DOCSIS, and is referred to as a Converged Cable Access Platform (CCAP). When the QAM is physically removed from an integrated CMTS and placed downstream it is known as an edge QAM (EQAM) or downstream PHY device. Thus, the CCAP architecture allows DOCSIS and existing video distribution to be combined downstream, thereby allowing network component reuse to reduce overall costs. While providing a more modular architecture, these downstream physical layer devices have a disadvantage in that they each must be manually configured by a network administrator for many of their operating parameters and are not configured with an integrated upstream equivalent of their downstream capability.

For downstream (DS) communication, a downstream protocol has been developed for downstream data transport. The protocol is the Downstream External PHY Interface (DEPI) protocol and is a set of extensions to the Layer 2 Tunneling Protocol version 3 (L2TPv3) protocol that permits an M-CMTS core to connect to and control an EQAM. A standard use of DEPI comprises a Media Access Control (MAC)-to-physical layer (PHY) pair, and has a control connection for managing the DEPI control plane and a unicast data session for transporting downstream data, referred to as a data plane. The payload of the DOCSIS frame within the DEPI data session itself may carry IP unicast or IP multicast traffic for a particular endpoint, however, the control traffic and outer encapsulation of the data traffic is unicast.

BRIEF DESCRIPTION OF THE DRAWINGS

The features and advantages of MHA downstream multicast of the present disclosure will become apparent upon consideration of the following description of example embodiments thereof, particularly when taken in conjunction with the accompanying drawings wherein like reference numerals in the various figures are utilized to designate like components.

FIG. 8 is an example procedural flowchart illustrating the manner in which a multicast information is sent to plural PHY devices.

DESCRIPTION OF EXAMPLE EMBODIMENTS

Overview

Techniques are provided herein for sending a control plane message from a Cable Modem Termination System (CMTS) comprising information configured to provide multicast address information to plurality of physical layer devices. An acknowledgement message is received from one or more of the plurality of physical layer devices. Multicast DEPI data plane traffic is sent to the plurality of physical layer devices.

Example Embodiments

Figure 1A:
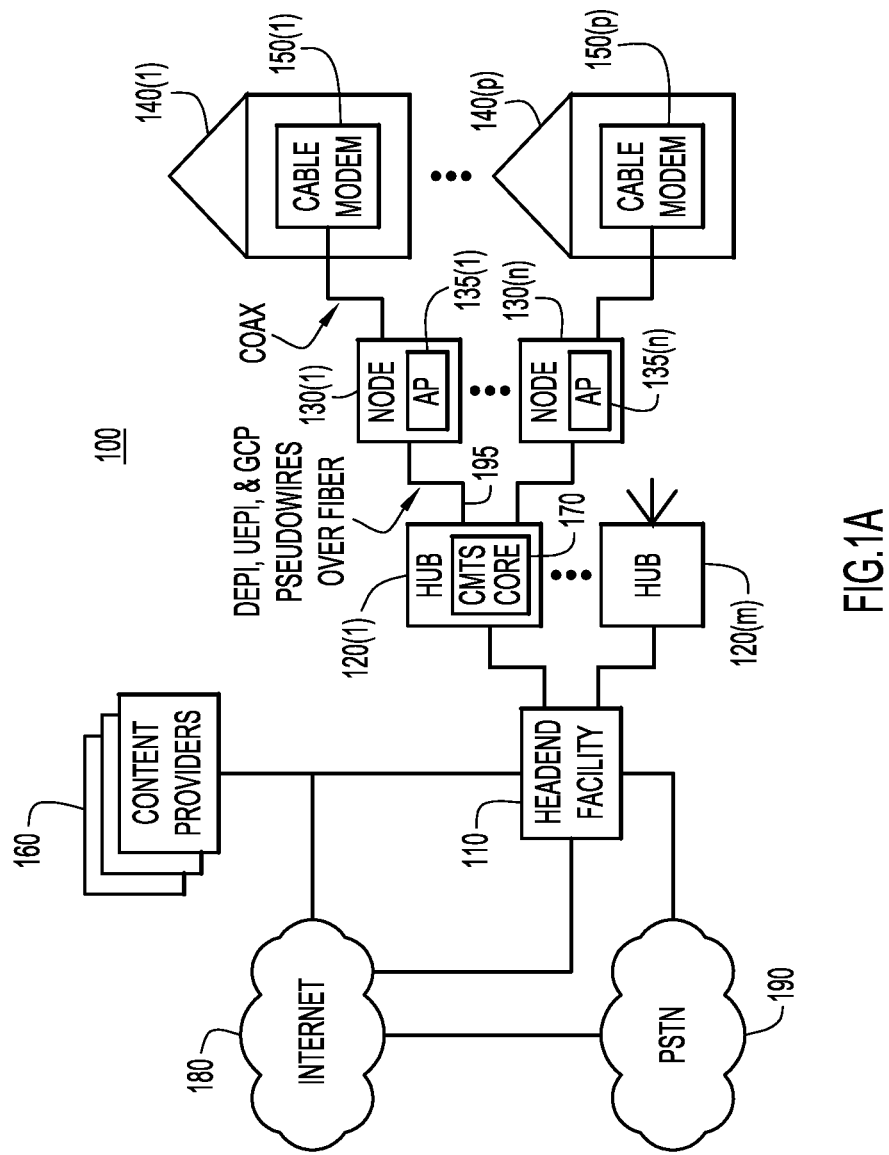
FIG. 1A is an example block diagram of a cable television distribution system employing control plane pseudowires according to the techniques described herein.

Referring to FIG. 1A, an example cable system or network 100 is shown. Specifically, the system 100 includes a headend facility (HEF) 110, a plurality of hubs 120(1)-120(*m*), a plurality of nodes 130(1)-130(*n*), and a plurality of customers 140(1)-140(*p*). Each of the hubs 120 or HEF 110 may have a cable modem termination system (CMTS) such as CMTS 170 shown in hub 120(1). Note that any given CMTS may reside in a hub or elsewhere, depending on system design. Each of the nodes 130(1)-130(*n*) has a one or more corresponding CCAP access points (APs) 135(1)-135(*n*), while each of the customers 140(1)-140(*p*) has a one or more corresponding CMs 150(1)-150(*p*). The APs 135(1)-135(*m*) may be considered to be CCAP access points.

Figure 1B:
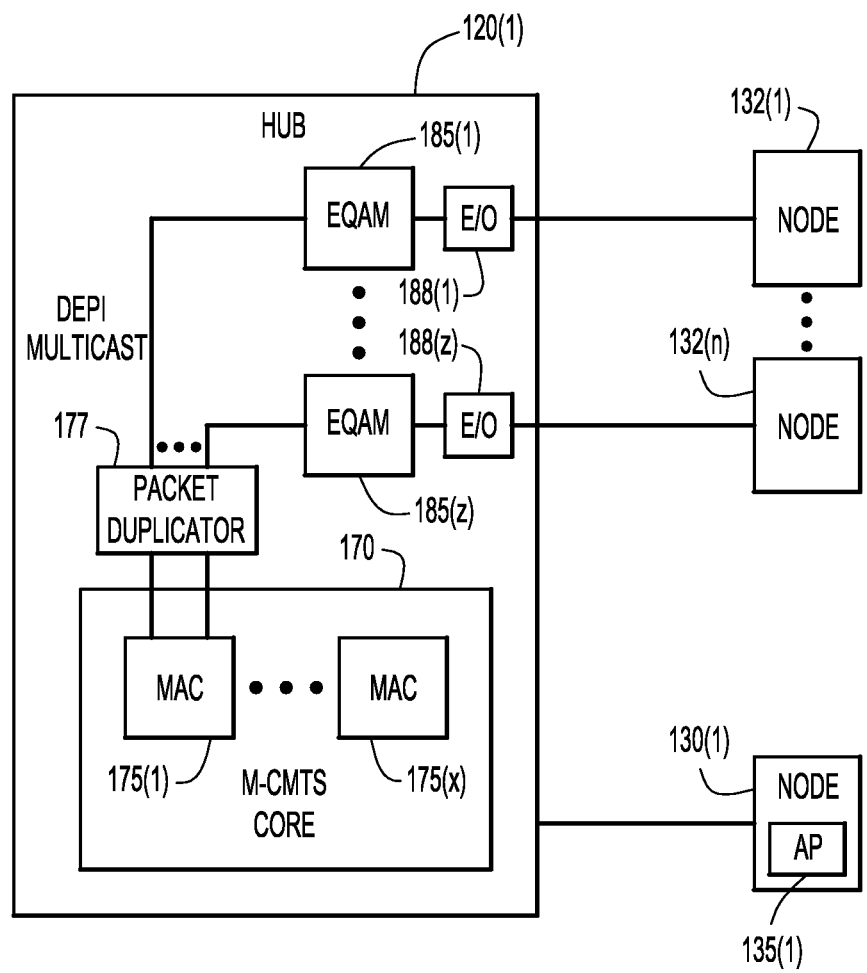
FIG. 1B is an example block diagram of a hub from FIG. 1A with an M-CMTS that services multiple EQAMs.

The HEF 110 is coupled to the Internet 180, content providers 160, and Public Switched Telephone Network 190, to provide these services to customers 140(1) and 140(2). The HEF 110 is connected to various content providers 160 for providing media content (e.g., movies, television channels, etc.). The content is further distributed by hubs 120(1)-120(*m*) to plurality of nodes. In this example, hub 120(1) distributes content to nodes 130(1)-130(*n*). Nodes 130(1)-130(*n*) distribute content to various customers, e.g., node 130(1) distributes the content to customer 140(1) in the form of conventional digital or Internet Protocol (IP) television. FIG. 1B shows an alternate implementation for hub 120(1) in which a single M-CMTS MAC services multiple EQAMs via multicast using a technique known as RF spanning and will be described later.

Nodes 130(1)-**130(*n*) communicate via optical fibers with hub 120(1) and via coaxial (coax) cable to customer premises 140(1)-140(*p*), and as such the combination of fiber and coax is known as a hybrid fiber coax (HFC) network (any combination of fiber, coax, Ethernet cable, may be used anywhere in system 100). CMTS 170** is used to provide high speed data services including cable Internet, voice over IP (VoIP), and IP television services to various subscribers.

The HEF 110 is coupled to Internet 180 and PSTN 190 for providing Internet and telephony services (e.g., to and from customer 140(1)-**140(*p*)). Media content may also be distributed by content providers 160 via Internet 180. Each of the hubs 120(1)-120(*m*) may also be coupled to Internet 180 and PSTN 190**. DOCSIS is used to convey Internet or other packet based networking information, as well as packetized digital video between CMTSs and CMs.

DOCSIS may be carried between CMTS core 170 and node 130(1) using fiber optic or other medium at the physical layer. The physical (PHY) layer may be referred to herein simply as a downstream PHY or PHY layer. At node 130(1), CCAP AP 135(1) converts the downstream optical PHY to downstream coaxial PHY for transmission to CM 150(1). Similarly, CCAP AP 135(1) converts the upstream coaxial PHY to upstream optical PHY for transmission to CMTS core 170. CCAP AP 135(1) may also provide Media Access Control (MAC) protocol layer services. In other M-CMTS designs, the CCAP access point may be collocated with the M-CMTS as part of a PHY shelf. These operations will be described in greater details in connection with FIG. 2.

Traditional or existing M-CMTS architectures employ a downstream PHY, e.g., a fiber node, which houses one or more EQAMs to provide radio frequency (RF) modulation for downstream transmission. It should be understood that various electrical-to-optical (E/O) and optical-to-electrical (OLE) conversions may take place along the downstream and upstream DOCSIS pathways, with a coaxial PHY ultimately presented at the customer premise, e.g., at CMs 150(1)-150(*p*). The downstream nodes can employ an Internet Protocol (IP) tunnel that encapsulates DOCSIS according to the Downstream External-PHY Interface (DEPI) specification. While DEPI provides some control plane information, this information may be limited to the DOCSIS realm. As such, hardware, firmware, and/or software components of the CCAP access point are configured manually, e.g., or whether the EQAM will use QAM-64 or QAM-256 modulation as is known in the art. Some downstream parameters may be configured using DEPI. The CCAP access point's IP address and station ID are traditionally configured manually.

According to the techniques described herein, a control plane tunnel is added that facilitates configuration of a CCAP access point, the CCAP access point having an architecture that interfaces with the control plane tunnel. The control plane tunnel uses a new protocol referred to as Generic Control Protocol (GCP) that will be briefly described hereinafter. In addition, an upstream External-PHY Interface (UEPI) tunnel is introduced that performs an upstream function corresponding to DEPI, since upstream communication is often operated over a separate communication pathway.

DOCSIS version 3.1 enables Orthogonal Frequency Division Multiplexing (OFDM) techniques for RF transmission. While DEPI has EQAM control plane functionality, it is not currently designed to configure OFDM PHYs, but could be extended to cover this scenario. However, by separating the control plane into GCP, protocols such as DEPI and UEPI can be relieved of control plane responsibility, thereby making DEPI and UEPI agnostic toward the hardware and the associated modulation schemes.

The GCP, DEPI, and UEPI tunnels may be referred to as pseudowires as indicated by link 195 between CMTS 170 and node 130(1). A pseudowire is a network connection that encapsulates a point-to-point protocol using a packet network protocol, where the encapsulation is transparent to the point-to-point endpoints. Many pseudowires carry time sensitive data or protocols that require synchronization and therefore use a timing source. The pseudowires may be facilitated, e.g., by Multi-Protocol Label Switching (MPLS) or L2TPv3. Note that technically, GCP is not a pseudowire, per se, since it carries control plane information, but for ease of description, GCP may be conceptually thought of as a pseudowire. Any node or access point in system 100 may include hardware and software provisioned to implement the techniques described herein may be configured in a manner as described for node 130(1) and/or access point 135(1).

Figure 2:
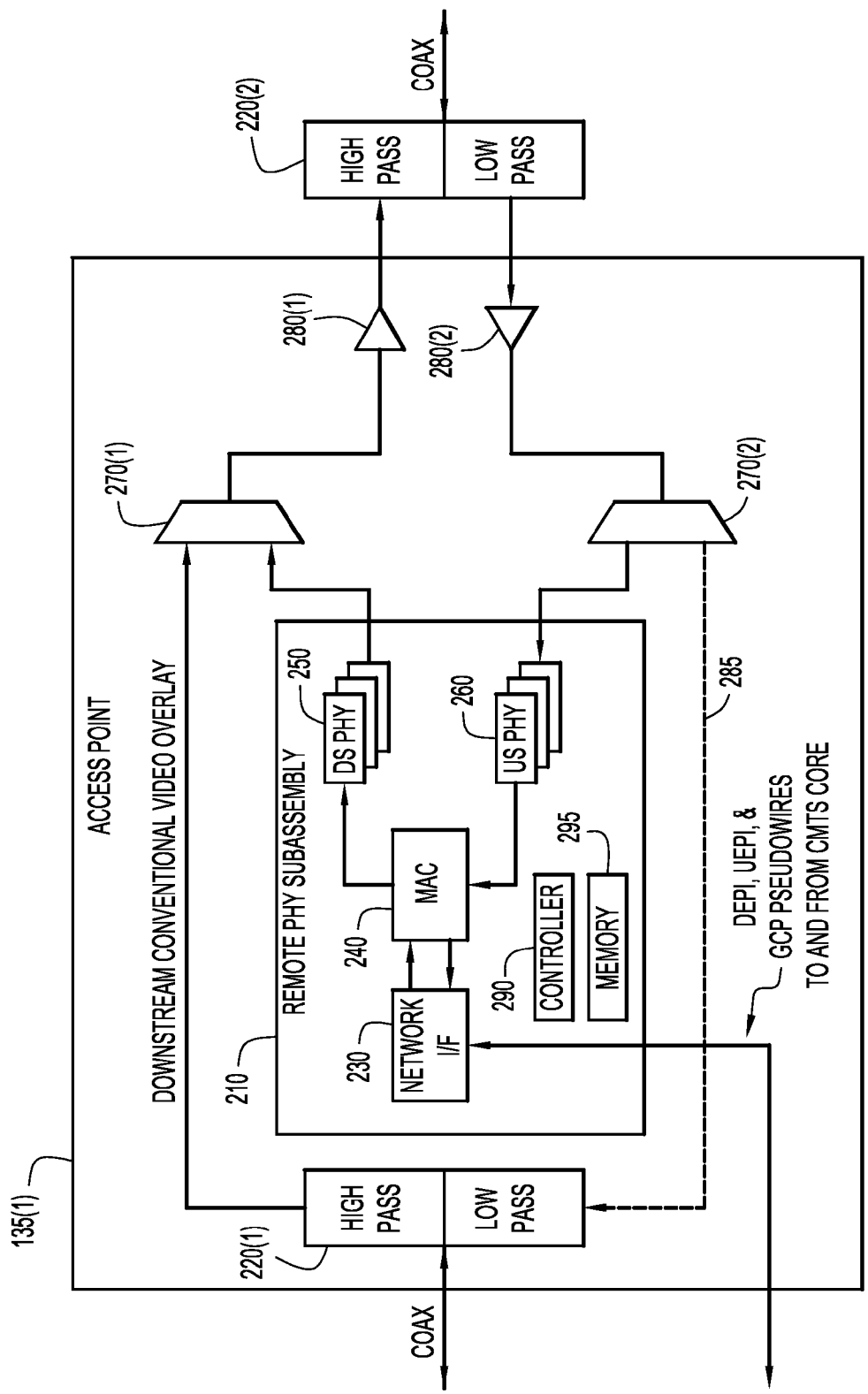
FIG. 2 is an example block diagram of a CCAP access point housed within the nodes shown in FIG. 1A that is configured to connect the CMTS via pseudowires.

An example block diagram of a CCAP access point, e.g., access point 135(1), housed within the nodes shown in FIG. 1A is illustrated in FIG. 2. CCAP AP 135(1) is configured to connect the CMTS via GCP, DEPI, and UEPI pseudowires and to a plurality of CMs, e.g., DOCSIS set-top gateways (DSGs) or CMs 150(1)-150(*p*). AP 135(1) may contain optional high and low pass filters or diplexers 220(1) and 220(2), as well as optional upstream and downstream amplifiers 270(1) and 270(2) to facilitate one or more downstream and upstream pass through connections. A pass through connection may be used for video overlays or other bypass signaling, e.g., for switched digital video (SDV) sent from another device or system. For example, some downstream spectrum can be allocated to headend supplied video, e.g., video on demand (VOD) or switched digital video (SDV), while other spectrum is allocated for DOCSIS. The pass through connection may contain an in-line attenuator to match the power of the pass through video with the output power of remote PHY subassembly at combiner 270(1). In other examples, the CCAP AP is an optical node, a CCAP external PHY, or DOCSIS PHY. These devices can be remote to the CMTS or part of a PHY shelf with the CMTS core. Video can be encapsulated in DEPI and controlled by GCP.

AP 135(1) comprises a remote PHY subassembly 210 for converting, e.g., a downstream incoming PHY layer to a downstream coaxial PHY layer for transmission to a downstream device, e.g., CM 150(1). Remote PHY subassembly 210 includes a network interface (I/F) 230, a MAC layer interface 240, a plurality of downstream (DS) PHY transmitters 250, a plurality of upstream (US) PHY receivers 260, a controller 290, and memory 295. Combiner 270(1) combines video overlay with DOCSIS from DS PHYs 250 for downstream forwarding and splitter 270(2) splits the DOCSIS upstream to US PHYs 260.

For the video or other bypass mechanisms, PHY layer downstream video overlay is received at diplexer 220(1) and forwarded by way of the high pass filter to combiner 270(1) and is further filtered by the high pass side of diplexer 220(2). On the upstream side, diplexer 220(2) passes lower frequency RF upstream components, e.g., non-DOCSIS CM upstream signals, and blocks high frequency RF components that may interfere with downstream communication. Splitter 270(2) also splits the upstream signal to diplexer 220(1) along an optional (dashed) return path 285. Return path 285 is optional because a DOCSIS return path is provided via network interface 230.

The network interface 230 interfaces the DOCSIS upstream and downstream with an M-CMTS core, e.g., CMTS core 170. The network interface 230 may comprise, e.g., one or more of an optical interface, an Ethernet over a passive optical network (EPON) interface, a Gigabit Ethernet over a passive optical network (GPON) interface, an Ethernet interface, and an electrical network interface. MAC layer 240 decapsulates the MAC and forwards the frame and encapsulates frames for upstream transmission, e.g., UEPI encapsulation. For example, the MAC layer 240 detects incoming packets or frames using start of frame and end of frame delimiters. Before forwarding the frame for further processing, the MAC layer may prepend an internal header onto the frame that provides upstream or downstream flows with details such as ingress port, type of port, ingress Virtual Local Area Network (VLAN), frame quality of service (QoS) markings, and a timestamp indicating when the frame entered the AP. The MAC layer 240 may also check that the received downstream frame contains no errors by validating its cyclic redundancy check (CRC). The MAC layer 240 may provide any formatting necessary, drop outdated frames, and add or remove the appropriate header information.

On the downstream side, DOCSIS streams, by way of MAC, or other information, is forwarded to the plurality of DS PHYs 250 for reception by a plurality of downstream devices, e.g., CMs 150(1)-150(p). The plurality of DS PHYs will modulate the various DOCSIS downstreams or flows on the appropriate RF channel to CMs 150(1)-150(p). The plurality of DS PHYs is combined with video overlays by combiner 270(1). For the return or upstream path, DOCSIS streams are divided from bypass streams by splitter 270(2). The DOCSIS upstream flows are received by the plurality of US PHYs 260, processed by MAC interface 240, and forwarded by network interface 230 to CMTS 170. The MAC interface 240 encapsulates the upstream packets for transmission to CMTS core 170.

In order to facilitate downstream and upstream flows, remote PHY subassembly 210 may include a controller 290 and memory 295, or other facilitating hardware, firmware, and software. Controller 290 and/or memory 295 may be connected to any of the components in AP 135(1), e.g., via a circuit board or other interface. As mentioned above, prior M-CMTS implementations of downstream PHYs are typically unicast sessions, e.g., DEPI MAC and PHY layers are paired in a one-to-one correspondence. By virtue of the techniques described herein, a single upstream MAC can support multiple downstream PHYs via multicast techniques. These techniques will be further described in connection with the remaining figures.

Memory unit 295 stores data and/or software or processor instructions that are executed to operate the AP 135(1) by controller 290. The DEPI and UEPI pseudowires carry DOCSIS data and control plane information, while AP 135(1) configuration information is conveyed via GCP. The controller 290 may be a microcontroller, processor, field programmable gate array (FPGA), application specific integrated circuit (ASIC), and the like. The controller 290 is programmed to configure the various components in AP 135(1). The memory 295 may be provided to facilitate the techniques described herein that is separate or part of the controller 290. Any form of non-transitory tangible or computer readable media may be provided, e.g., random access memory (RAM) or flash memory. The interface unit 230 may be equipped with a wireless (e.g., Wi-Fi®/Long Term Evolution (LTE)) or wired network interface (e.g., Ethernet) so that GCP control programming information or packet based information may be exchanged. Similar hardware memory, processors, and software elements may be present throughout network 100, e.g., CMTS 170 has such processing capability.

Ultimately, GCP allows one device to control another device. GCP allows the reuse of data bus structures from other protocols, and thus, allows direct read and/or write of hardware, firmware, and/or software configuration parameters to include reads and writes at the hardware register level to include any associated device interrupts and servicing any interrupt service routines (ISRs). GCP may include configuration of port, channels, frequencies, modulation schemes, and protocols. In some implementations there may be multiple controllers, e.g., a node controller and an ASIC controller. A first GCP connection between the M-CMTS core and node controller may use structured access (TLV) messages, while second GCP connection between the node controller and the ASIC controller may carry register access messages between the node controller and the ASIC controller.

Figure 3:
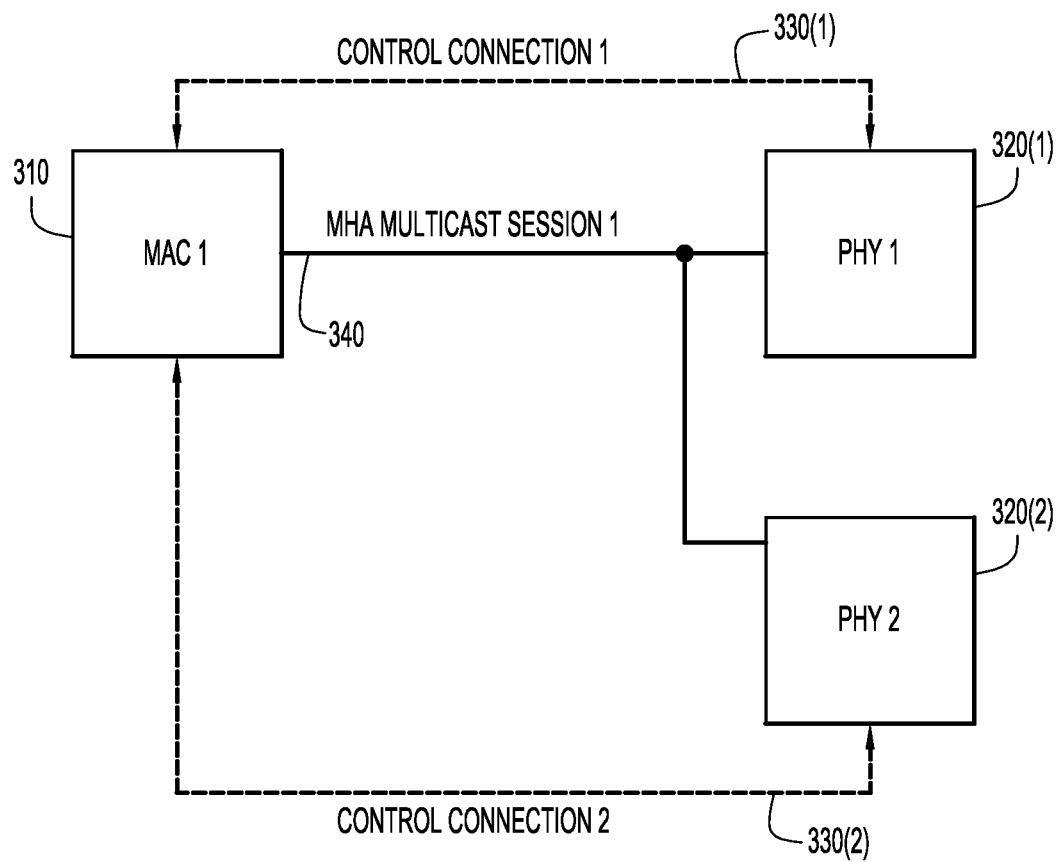
FIGS. 3-5 are example block diagrams of MHA MAC and PHY components that implement MHA multicast.

Turning now to FIG. 3, an example block diagram of MHA components that multicast via single DOCSIS MAC channel on the M-CMTS Core to send packets to one or more DOCSIS PHY channels that may be located within one or more RF ports, and that may be located in nearby CMTS components or within one or more downstream devices (e.g., a CCAP AP). The MHA components shown in FIG. 3 include upstream MAC 310 and downstream PHYs 320(1) and 320(2). Control connections 330(1) and 330(2) allow control plane information to be exchanged between MAC 310 and PHYs 320(1) and 320(2). In this example, a multicast session 340, e.g., one or more DEPI sessions, has been established between MAC 310 and PHYs 320(1) and 320(2).

The multicast techniques are referred to herein as "MHA multicast" and embodiments thereof are compatible with MHA version 1 (v1) and MHA version 2 (v2) systems, and extensions stemming therefrom. When MHAv1 is employed, the external PHY device is an EQAM, as mentioned above. In MHAv2, the external PHY device is a CCAP AP or in some implementations, a coaxial media converter (CMC). MHA multicast modifies the usage of the DEPI (Downstream External PHY Interface) protocol in the downstream direction to incorporate multicast in lieu of traditional unicast implementations. The protocol refinements to implement multicast can be directly applied to L2TPv3 with or without the DEPI extensions. A process for implementing MHA multicast by way of an M-CMTS is described in connection with FIG. 8, and utilized the processing and other resources available in the M-CMTS.

When multicast DEPI pseudowires are employed, there is an inner Ethernet frame and an outer Ethernet frame. The inner frames represent end-to-end network traffic that could be unicast or multicast. With traditional DEPI connections or sessions, the outer encapsulation is always unicast. When MHA multicast is used, the outer frame is multicast. To keep the distinction clear, the following terms are introduced: MHA "packet" multicast and MHA "payload" multicast. With MHA packet multicast, the outer encapsulation is multicast, e.g., multicast at the L2TPv3 packet level, and is between the M-CMTS core and the external PHY device, and with MHA payload multicast, the inner framing is multicast. The payload is the end-to-end network traffic that is being carried in the DEPI session.

Multicast frames/packets contain both a multicast IP destination address and a multicast destination Ethernet address. There are at least two possible use-cases for MHA multicast. The first use-case is for RF spanning with EQAMs. The second use-case is for remote PHY (OCU type) connectivity. Currently, one RF port on a CMTS or EQAM may be wired to multiple optical nodes in an HFC plant. This is typically done in video broadcast groups. It can also be done with DOCSIS groups that carry IP video that is broadcast in nature. This one-to-many technique is also known as RF spanning. In a DOCSIS network, RF spanning allows the cost of the CMTS (MAC and PHY) to be amortized across multiple optical nodes. With the continued drop in QAM costs, the increased density of QAM channels per RF port, and the increased adoption of M-CMTS architectures, a virtual RF spanning architecture becomes of interest.

With virtual RF spanning, the MAC entity located in the M-CMTS is shared across multiple PHY entities located in one or more EQAMs where each PHY entity is associated with a port on the EQAM that is then associated with an optical node. This concept is illustrated in FIG. 1B, which is a variation of some of the components from FIG. 1A. FIG. 1B shows hub 120(1), a plurality of nodes 132(1)-132(n), e.g., fiber nodes, and the node 130(1) with AP 135(1) from FIG. 1A. Hub 120(1) has the M-CMTS core 170 with a plurality MAC layer interfaces 175(1)-175(x), a switch or packet duplicator 177 coupled by a DEPI multicast pseudowires to a plurality of EQAMs 185(1)-185(z). Each EQAM has a corresponding electrical-to-optical (E/O) converter 188(1)-188(z) to enable transmission over optical fiber.

In this embodiment, there is already one optical node per EQAM port as some of the channels in the RF port are unicast and require direct connectivity from the EQAM port to the optical node, e.g., nodes 132(1)-132(n). Through the use of MHA multicast, the RF channels within the RF Ports that are intended to be broadcast can be shared across RF ports with MHA Multicast instead of having a dedicated RF port with a broadcast RF channel that is then separately wired with combiners into the forward path of each optical node. Accordingly, when MHA multicast is employed, the RF spanning is done virtually, i.e., one CMTS MAC channel, e.g., MAC 175(1) is connected to multiple EQAM PHY channels across multiple ports on one or more EQAMs, e.g., EQAMs 185(1)-185(z) as shown in FIG. 1B. MHA multicast, on a per QAM channel basis, sends the same traffic to one channel within each port. An additional MAC 175 may be used to communicate with AP 135(1) in node 130(1), thereby enabling the use of different node types that can be coupled to EQAMs, pseudowires, or a combination of both EQAMs and pseudowires.

Virtual RF spanning is useful for video over DOCSIS (VDOC) broadcast, i.e., one IP video session can be sent from the DOCSIS CMTS core to multiple QAM channels across multiple ports of an EQAM or even across multiple EQAMs. Virtual RF spanning is also useful for DOCSIS service group sizing. DOCSIS downstreams and upstreams are combined together into service groups. It may be desirable to have one set of service groups that are small, e.g., one downstream and one upstream per node. This may be referred to as a 1×1 service group. It may then be useful to have a second DOCSIS service group that spans a set of optical nodes. For example, when eight optical nodes are spanned, then a 1×8 service group is created. MHA multicast allows eight distinct PHY channels to be matched to one DOCSIS MAC resource. By way of example, the architecture shown in FIG. 3 can be referred to as a 1×2 service group.

This scenario works with DOCSIS 3.0 Channel Bonding. For example, a service flow (data or video) might be packet bonded across four downstream channels in 1×8 service groups. The CMTS Core uses the DOCSIS protocol to sort and tag each packet and place the packets on the appropriate downstream MAC channel. The MHA Multicast tunnels then deliver the packets from each of the four CMTS Core MAC channels to all 32 (4 channels×1×8) EQAM PHY channels.

The second use-case for MHA multicast is for MHA version 2 (MHAv2) systems as applied to an M-CMTS system with a CCAP AP. MHAv2 is like MHAv1 except that the DOCSIS upstream PHY is also remotely located in the external PHY device, e.g., a CCAP AP or CMC. Downstream operation remains the same. CCAP AP devices tend to have only one remote PHY with one RF port, but may be equipped with multiple remote PHYs serving multiple RF ports. MHA multicast is used to allow multiple CCAP APs to be serviced by a single set of M-CMTS resources. MHA multicast connects multiple remote CCAP AP PHYs to one MAC domain, thereby reducing M-CMTS costs. For example, instead of having 60 MAC domains support 60 CCAP APs, 60 MAC domains can support 600 CCAP APs. MHA multicast is also applicable where the total bandwidth for the CCAP APs exceed the bandwidth of the connecting Ethernet/EPON link.

Thus, with the MHA multicast configuration shown in FIG. 3, there is one M-CMTS MAC to multiple M-CMTS or CCAP AP PHYs. The data capacity of the MAC channel is the same as that of a single PHY channel. Thus all PHY channels share the same bandwidth. For example, an 8 channel MAC might feed four APs, each of which have 8 PHY channels. The overall encapsulation still uses MPEG transport (MPT) or MPEG-TS, and MPT is agnostic to the payload packets, whether they are unicast or multicast in nature.

As shown in FIG. 3, the control plane is point to point (P2P), while the data plane is point-to-multipoint (P2MP). There is a unique P2P tunnel from the M-CMTS to each CCAP AP. This tunnel is used for control plane signaling. The data plane uses a multicast MAC and a multicast IP address. The M-CMTS uses L2TPv3 P2P control plane to tell each CCAP AP endpoint what multicast IP address to subscribe to. The control plane may use GCP, which adapts L2TPv3 attribute-value-pairs (AVPs) for device control. Currently, L2TPv3 uses the same destination IP address for the control plane and the unicast data plane. New L2TPv3 AVPs are used to specify the IP source address and IP source and group address {S, G} for the multicast operation. The existence of the L2TPv3 tunnel is sufficient to manage the end points. The new AVPs are described in connection with FIGS. 6 and 7 below.

The default sub-layer encapsulation for DEPI is D-MPT (MPEG-TS). MPT mode can be used for MHA multicast when each QAM channel is connected to one and only one data session. Note that with DEPI MPT encapsulation any multiplexing of mixed data sessions, e.g., MHA unicast or MHA multicast, generally occurs prior to the MPT encapsulation. As a result, the MPT encapsulation mechanism essentially prevents the EQAM from accepting data from more than one source. The CMTS core has to be aware of the multiple CCAP AP downstream groups and how those groups line up with specific upstream sessions. For example, it is possible to use a single M-CMTS MAC and four CCAP APs, where each CCAP AP has 16 downstream sessions and four upstream sessions. The CMTS views this as one forward path and four return paths, all in a single MAC domain. Each upstream is assigned a unique US channel ID within the MAC domain. The CMTS is configured with the MAC addresses of the CCAP APs and the Transport Stream IDs (TSIDs) of the QAM channels that are placed in the same MAC domain. Alternatively, the CMTS can be given a group of MAC addresses, a MAC domain size, and then the CMTS assigns QAM channels to the MAC domains.

In addition to basic MHA multicast that uses static addressing, various extensions can be added. If dynamic multicast addressing is desired, then Internet Group Management Protocol (IGMP) or an equivalent protocol may be used (or when network, signaling and management functions associated with IGMP were needed). If the CCAP AP is connected to the CMTS core with a single hop network segment, then any multicast packet sent by the CMTS Core will always arrive at the CCAP AP and it may be possible to dispense with IGMP. This scenario also applies when there is an interim network node that is bridged where multicast packets are flooded on all output ports.

If the CCAP AP is connected with a network that requires forwarding information to be established, such as a routed network or a bridged network that learns multicast paths, then the CMTS Core and the CCAP AP can run IGMP so that the interim nodes can learn the multicast addresses and populate their forwarding tables appropriately. MHA Multicast is independent of the underlying encapsulation. D-MPT is the default encapsulation only because it is what is in general use for DEPI. There are other encapsulation choices. The encapsulation could be PSP (Packet Streaming Protocol). If the encapsulation is PSP, MAP control plane traffic could be placed in its own session. That MAP session could be used for both sending a MAP to the QAM downstream and to the CCAP AP upstream circuit. The encapsulation could also be Ethernet over L2TPv3 with the DOCSIS downstream framer in the CCAP AP. In this sense, MHA Multicast becomes L2TPv3 multicast.

Figure 4:
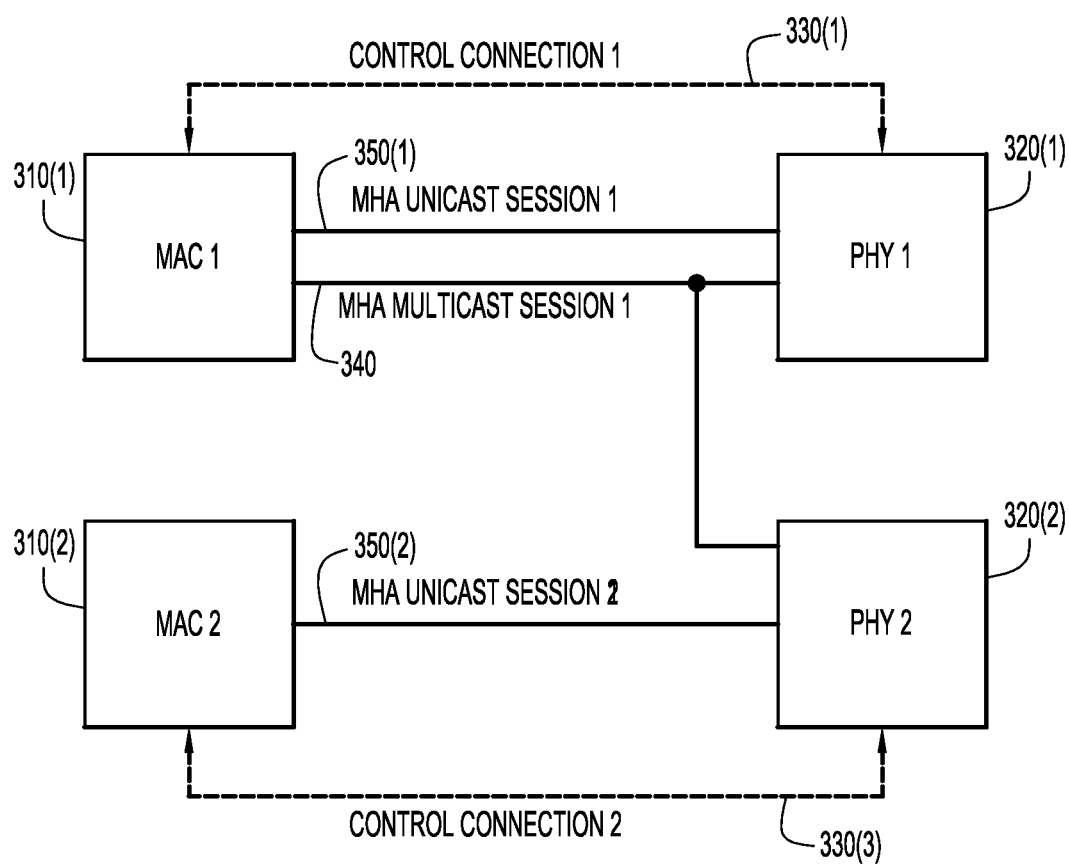

Turning now to FIG. 4, the MHA components from FIG. 3 are shown along with an additional M-CMTS MAC domain 310(2). In this example, by using PSP the CMTS can separate unicast traffic into DEPI unicast sessions and multicast traffic into DEPI multicast sessions. A QAM channel can subscribe to one DEPI unicast session and one or more DEPI multicast sessions. As illustrated in FIG. 4, there is one unicast session 350(1) between MAC 310(1) and PHY 320(1), and one unicast session 350(2) between MAC 310(2) and PHY 320(2). The MHA multicast session 340 remains the same as in FIG. 3.

When the encapsulation is packet based, e.g., Packet Streaming Protocol (PSP) or Ethernet over L2TPv3 then packet multiplexing can be employed within a QAM channel. One advantage of this approach is that the efficiencies of multicast are maintained across the entire network. If the MHA packet was unicast only, then MHA payload multicast (end-to-end network traffic) would have to be replicated across each MHA unicast session and hence the same payload multicast packet would traverse this network more than once and the CMTS would have to actively manage the bandwidth of each QAM channel. Furthermore, the M-CMTS would have to keep track of the sum of all unicast and multicast traffic going to each QAM so that the QAM does not have a buffer overflow.

Figure 5:
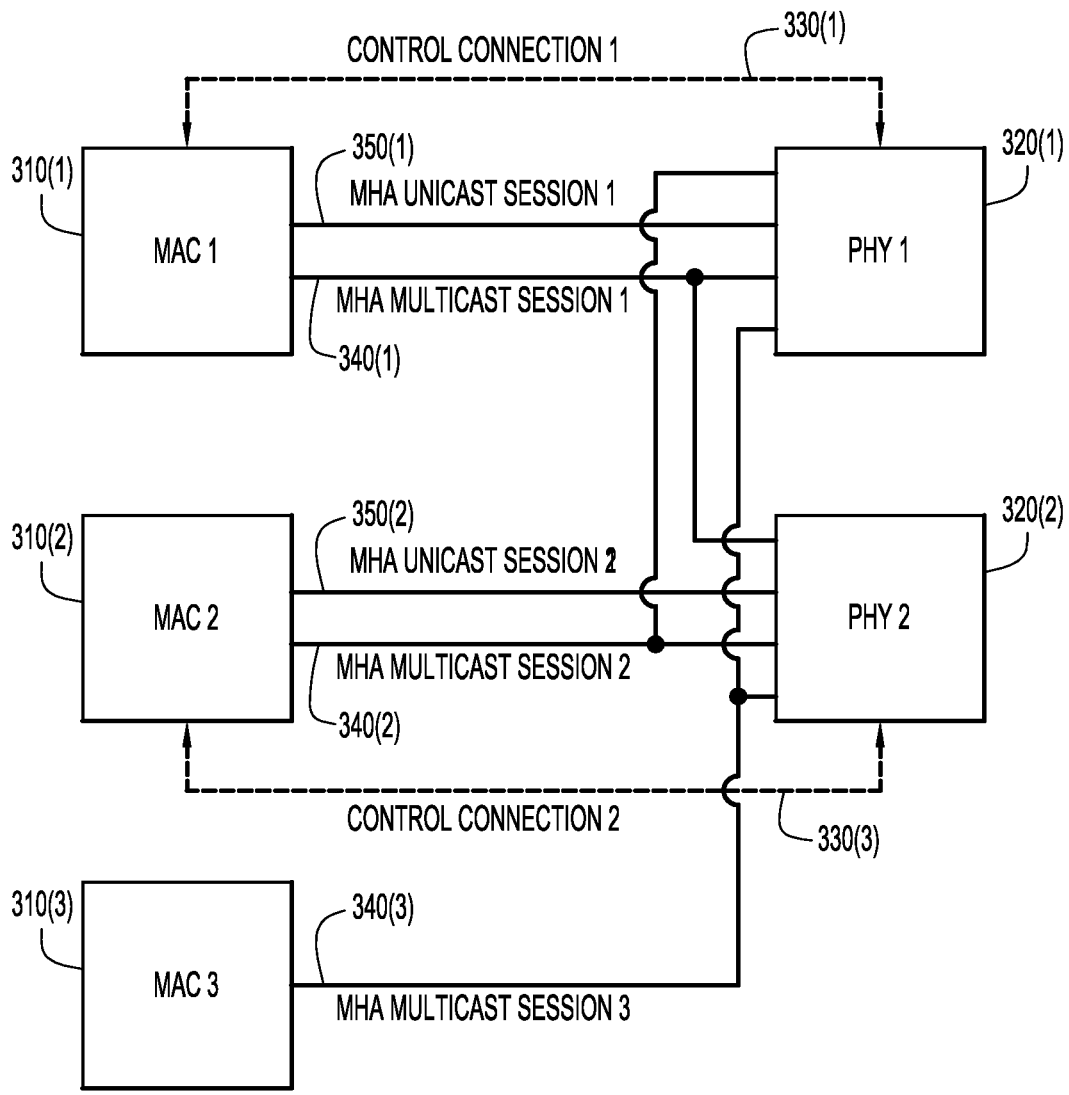

Referring to FIG. 5, the MHA components from FIG. 4 are shown along with an additional M-CMTS MAC domain 310(3). The MHA multicast session 340 and the unicast sessions 350(1) and 350(2) remain the same as in FIG. 3. In this example, there are two additional multicast sessions 350(2) and 350(3) which are subscribed to by both PHYs 320(1) and 320(2). Accordingly, all three multicast streams 350(1)-350(3) originating from MACs 310(1)-310(3), respectively, each terminate at PHYs 320(1) and 320(2).

As can be seen from FIG. 5, there are a combination of potential connections. The MHA multicast sessions can be supplied from any MAC channel that is supplying the unicast DEPI sessions or from a MAC channel that is separate from any of the unicast MAC channels. In most applications, a single DEPI tunnel can service a set of PHY channels. However, if the payload multicast traffic is first setup on its native MAC-PHY pair, and then the multicast session is extended to another QAM channel using a dynamic DEPI connection, then multiple DEPI multicast sessions to multiple QAM channels may get established.

Figure 6:
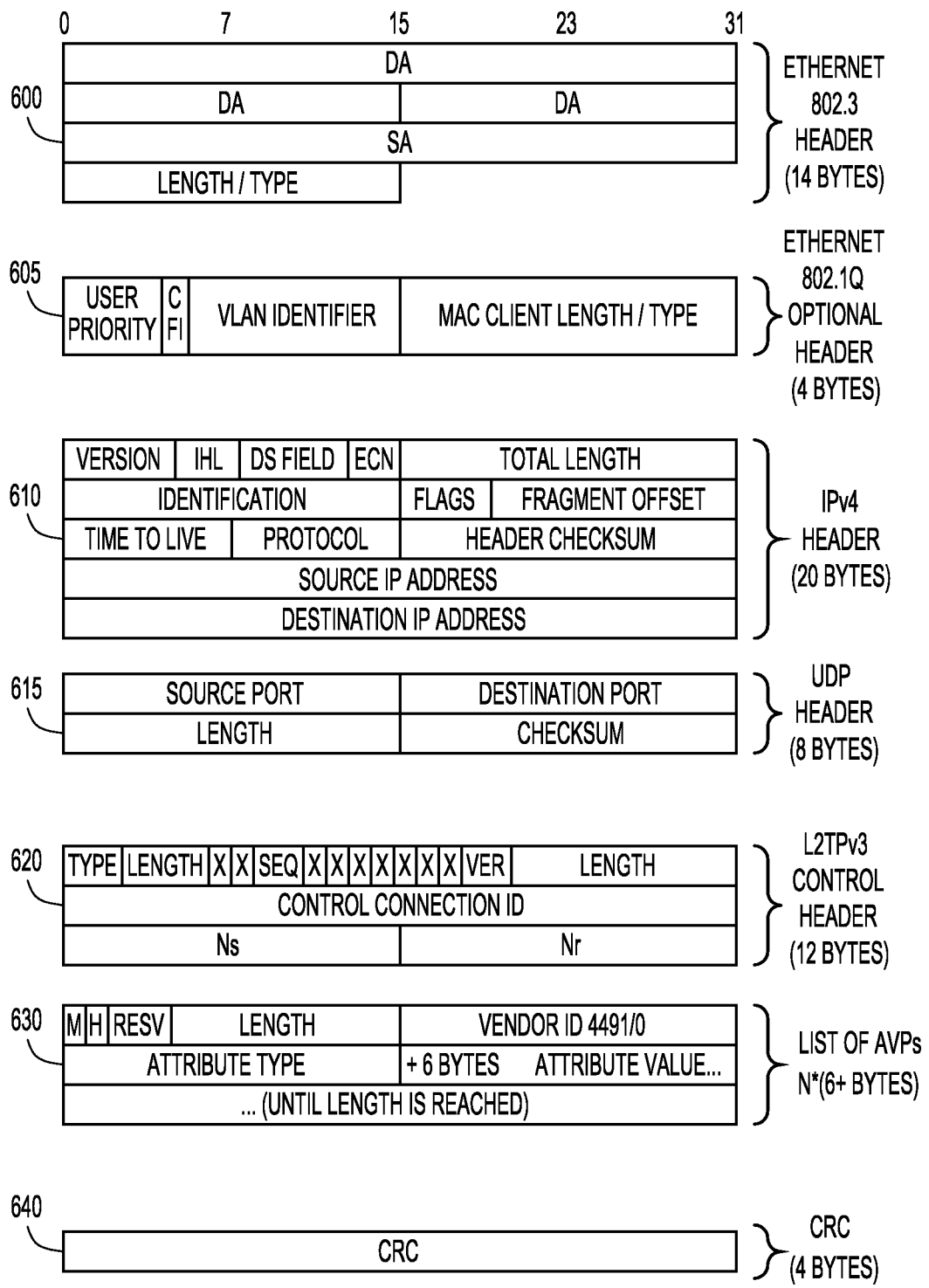
FIG. 6 is an example message format for sending control plane messages used to configure PHY devices.

If the DEPI sessions use packet based encapsulation, i.e., without using MPT, then the aggregate session bandwidth could be allowed to exceed the bandwidth of a single PHY channel. For example, each of four PHYs enable 38 Mbps, for a total of 152 Mbps, while the aggregate MAC channel has a limit of 100 Mbps. The CMTS can perform traffic shaping on a per QAM basis. The CMTS can then shape traffic on an aggregate MAC domain (DEPI session). Alternatively, the link bandwidth in the downstream and upstream can be viewed at with three levels, or a hierarchy: 1) bandwidth of each QAM resource, 2) bandwidth of the network link that aggregates the sessions (typically 1 Gbps or 10 Gbps), and 3) bandwidth within each MAC domain at the CMTS In order to facilitate control plane activity for MHA multicast, an L2TP tunnel is set up for transporting GCP AVPs. An example, L2TP packet for GCP transport is shown in FIG. 6. The packet has a standard Ethernet header 600 and CRC 640. Within the Ethernet packet is an optional VLAN header 605, an IPv6 or IPv4 header 610, an optional UDP header 615, an L2TPv3 control header 620, and a list of one or more L2TPv3 AVPs 630. The custom AVPs carry the MHA multicast configuration parameters.

As viewed in FIG. 6, L2TPv3 header 620 follows the standard format parameters. These fields follow the L2TPv3 Request for Comments (RFC) 3931 definitions for connection setup, flow, and teardown. The data field carries the custom AVP information for the UEPI control plane. AVPs 630 comprise M, H, length, vendor ID, attribute type, attribute value, and fields. The one bit mandatory (M) field determines whether or not the AVP is important enough to tear down the L2TPv3 connection and the hidden (H) field indicates whether or not encryption is used.

Figure 7:
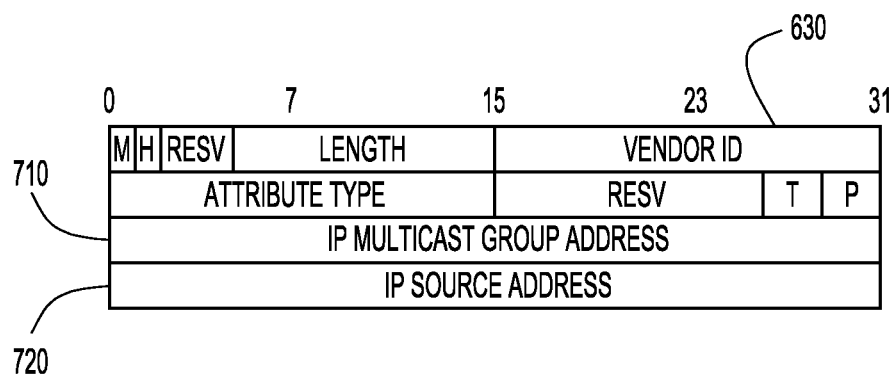
FIG. 7 is a specific example of a portion of a control plane message that can be used to provide multicast information to plural PHY devices.

A custom AVP is illustrated in FIG. 7. Standard L2TPv3 AVPs are not described herein. FIG. 7 shows the AVP field 630 from FIG. 6 with custom fields that include an IP multicast group (G) address 710 and a multicast source (S) address 720. The values for each of the custom AVP fields is described in Table 1, below:

TABLE 1

MHA multicast AVPs

| Variable | Length | Description |
| --- | --- | --- |
| M | 1 bit | Mandatory. Per L2TPv3, this bit is asserted (set to 1) if the sender wants the L2TPv3 session torn down if this AVP is rejected. Typically, this bit is set to 0. |
| H | 1 bit | Hidden. Per L2TPv3, this bit is asserted if the contents of the AVP are encrypted |
| Resv | 4 bits | Reserved. Set to all zeros by sender. Ignored by receiver. |
| Length | 10 bits | The length, in bytes, of the entire AVP including all headers and payload. |
| Vendor ID | 16 bits | The Vendor ID field indicates what organization has defined this AVP. The value of this field is assigned by IANA or CableLabs. |
| Attribute Type | 16 bits | This is the attribute number that identifies this as a GCP AVP. The value of this field is assigned by IANA or CableLabs. |
| Resv | 14 bits | Reserved. Set to all zeros by sender. Ignored by receiver. This field is the first field of the AVP payload. |

TABLE 1-continued

MHA multicast AVPs

| Variable | Length | Description |
|---|---|---|
| T | 1 bit | Type of multicast join:<br>0 = Static. No further protocols are necessary.<br>1 = Dynamic. A protocol such as IGMP should be used to further manage the multicast session |
| P | 1 bit | 0 = IPv4 Addresses<br>1 = IPv6 Addresses |
| IP GA | 32 or 128 bits | IP Group Address |
| IP SA | 32 or 128 bits | IP Source Address |

Referring now to FIG. 8, an example procedural flowchart illustrating a process 800 in which a multicast information is sent to plural PHY devices. At 810, a control plane message is sent from a CMTS, e.g., CMTS 170 (FIG. 1A) comprising information configured to provide multicast address information to plurality of physical layer devices, e.g., CCAP APs 135(1)-135(n). At 820, an acknowledgement message is received from one or more of the plurality of physical layer devices. At 830, multicast traffic, e.g., DEPI traffic, is sent to the plurality of physical layer devices.

At 840, a plurality of multicast streams is sent to the plurality of PHY layer devices using a plurality MAC layers associated with the CMTS, thereby enabling the PHY layer devices to selectively subscribe to multicast streams based on the control plane message. Optionally, at 850, the plurality of multicast streams are arranged into a multicast group comprising a DOCSIS Service Group, as described above. In general, the service group contains a set of CMs or a collection of downstream channels. The MHA multicast operation enables service group sizing as well as traffic shaping for bandwidth and QoS management.

In sum, techniques are provided for enabling multicast traffic for a CMTS MHA system. The techniques allow a single modular CMTS MAC domain to service a plurality of physical layer devices. When combined with an independent (GCP) control plane, DEPI, and UEPI, a downstream PHY device becomes a completely independent and scalable network element.

By virtue of the techniques described herein, MHA multicast, along with GCP, DEPI, and UEPI, the PHY devices can be stand-alone, independent, network components.

From the foregoing description, it will be appreciated that embodiments described herein make available a novel method, apparatuses, and system for control plane for configuring remote DOCSIS devices, where the method, apparatuses, and system enable a cable system operator or multi system/service operators (MSOs) in cable system environment to automatically configure a remote PHY device. It should be appreciated that the techniques described herein may be applied to any M-CMTS architecture with a distributed MAC and/or PHY layer, e.g., within CMTS chassis line cards or any associated rack equipment.

Having described preferred embodiments of new techniques for MHA multicast, it is believed that other modifications, variations and changes will be suggested to those skilled in the art in view of the teachings set forth herein. It is therefore to be understood that all such variations, modifications and changes are believed to fall within the scope defined by the appended claims.

The above description is by way of example only.

What is claimed is:

1. A method comprising:
at a Cable Modem Termination System (CMTS) including multiple media access control (MAC) layers:
establishing an individual control plane tunnel between each MAC layer and a corresponding one of multiple physical (PHY) layer devices;
sending via respective ones of the control plane tunnels control plane messages from the MAC layers to the PHY layer devices, the messages including multicast address information to enable individual ones of the PHY layer devices to selectively subscribe to multicast Downstream External PHY Interface (DEPI) traffic, each control plane message formatted as an Ethernet packet including an Internet Protocol (IP) header having source and destination IP addresses for the MAC and the PHY layers of the respective control tunnel, and a layer 2 tunneling protocol (L2TP) Attribute Value Pair (AVP) to identify an IP multicast group address to which the PHY layer devices belong and an IP multicast source address corresponding to the respective MAC layer;
receiving via the control plane tunnels acknowledgement messages from the PHY layer devices at the MAC layers;
establishing, at each MAC layer, an individual data plane multicast session separate from the control plane tunnels and that spans across the corresponding PHY layer device and other ones of the PHY layer devices from which the acknowledgement messages were received; and
multicasting DEPI traffic from the MAC layers to the PHY layer devices via the multicast sessions.

2. The method of claim 1, wherein sending the control plane messages comprises sending the control plane messages to the physical layer devices, which have a radio frequency (RF) modulator for transmitting data in the DEPI traffic to a plurality of endpoints.

3. The method of claim 1, wherein multicasting comprises multicasting the DEPI traffic to a multicast group comprising a Data-Over-Cable Service Interface Specification (DOCSIS) Service Group.

4. The method of claim 1, further comprising shaping the multicast DEPI traffic on one or more of a per PHY layer device basis and on a per Media Access Control (MAC) domain basis prior to multicasting the DEPI traffic.

5. The method of claim 1, further comprising sending unicast DEPI traffic to at least one of the PHY layer devices.

6. The method of claim 1, wherein sending the control plane messages comprise sending one of a Generic Control Protocol (GCP) message and an Internet Group Management Protocol (IGMP) message.

7. The method of claim 1, further comprising establishing a Layer 2 Tunneling Protocol (L2TP) pseudowire between the CMTS and the plurality of PHY layer devices, wherein multicasting comprises sending the DEPI traffic over the Layer 2 pseudowire.

8. The method of claim 1, further comprising:
establishing, in combination with the established individual control plane tunnels and the established individual multicast sessions, an individual unicast tunnel between each MAC layer and a corresponding one of multiple PHY layer devices; and
unicasting DEPI traffic from the MAC layers to the PHY layer devices via the unicast sessions.

9. The method of claim 1, wherein the AVP further includes:
a vendor identifier field to identify an organization that defined the AVP; and
a type of multicast join field to indicate whether or not further protocols are needed to manage a multicast session to which the AVP belongs.

10. The method of claim 9, wherein the AVP further includes:
- a field to indicate if a sender of the AVP wants the corresponding control plane tunnel torn down if the AVP is rejected;
- an attribute field to indicate whether the AVP is a Generic Control Protocol (GCP) AVP; and
- a field to indicate whether the IP multicast group and source addresses are in accordance with IPv3 or IPv4 addresses.

11. The method of claim 1, wherein the Ethernet packet further includes an Ethernet header including Ethernet destination and source addresses.

12. The method of claim 1, wherein sending the control plane messages further includes sending from the MAC layers to the PHY layer devices messages that tell the PHY layers what multicast IP address to subscribe to.

13. A system comprising:
- a Cable Modem Termination System (CMTS) including memory and a controller configured to implement multiple media access control (MAC) layers configured to:
- establish an individual control plane tunnel between each MAC layer and a corresponding one of multiple physical (PHY) layer devices;
- send via respective ones of the control plane tunnels control plane messages from the MAC layers to the PHY layer devices, the messages including multicast address information to enable individual ones of the PHY layer devices to selectively subscribe to multicast Downstream External PHY Interface (DEPI) traffic, each control plane message formatted as an Ethernet packet including an Internet Protocol (IP) header having source and destination IP addresses for the MAC and the PHY layers of the respective control tunnel, and a layer 2 tunneling protocol (L2TP) Attribute Value Pair (AVP) to identify an IP multicast group address to which the PHY layer devices belong and an IP multicast source address corresponding to the respective MAC layer;
- receive via the control plane tunnels acknowledgement messages from the PHY layer devices at the MAC layers;
- establish, at each MAC layer, an individual data plane multicast session separate from the control plane tunnels and that spans across the corresponding PHY layer device and other ones of the PHY layer devices from which the acknowledgement messages were received; and
- multicast DEPI traffic from the MAC layers to the PHY layer devices via the multicast sessions.

14. The system of claim 13, wherein the plurality of physical (PHY) layer devices each have a radio frequency (RF) modulator configured to transmit data in the DEPI traffic to a plurality of endpoints.

15. The system of claim 13, wherein the network device is configured to multicast the DEPI traffic to a multicast group comprising a Data-Over-Cable Service Interface Specification (DOCSIS) Service Group.

16. The system of claim 13, wherein the CMTS is further configured to shape the multicast DEPI traffic on one or more of a per PHY layer device basis and on a per MAC domain basis prior to multicasting the DEPI traffic.

17. The system of claim 13, wherein the CMTS is further configured to send unicast DEPI traffic to at least one of the PHY layer devices.

18. The system of claim 13, wherein the CMTS is further configured to establish a Layer 2 Tunneling Protocol (L2TP) pseudowire between the CMTS and the plurality of PHY layer devices.

19. One or more non-transitory computer readable media encoded with instructions that, when executed by a processor of a Cable Modem Termination System (CMTS) including multiple media access control (MAC) layers, cause the processor to:
- establish an individual control plane tunnel between each MAC layer and a corresponding one of multiple physical (PHY) layer devices;
- send via the control plane tunnels control plane messages from the MAC layers to the PHY layer devices, the messages including multicast address information to enable individual ones of the PHY layer devices to selectively subscribe to multicast Downstream External PHY Interface (DEPI) traffic, each control plane message formatted as an Ethernet packet including an Internet Protocol (IP) header having source and destination IP addresses for the MAC and the PHY layers of the respective control tunnel, and a layer 2 tunneling protocol (L2TP) Attribute Value Pair (AVP) to identify an IP multicast group address to which the PHY layer devices belong and an IP multicast source address corresponding to the respective MAC layer;
- receive via respective ones of the control plane tunnels acknowledgement messages from the PHY layer devices at the MAC layers;
- establish, at each MAC layer, an individual data plane multicast session separate from the control plane tunnels and that spans across the corresponding PHY layer device and other ones of the PHY layer devices from which the acknowledgement messages were received; and
- multicast DEPI traffic from the MAC layers to the PHY layer devices via the multicast sessions.

20. The non-transitory computer readable media of claim 19, wherein the instructions that send comprise instructions that when executed cause the processor to send the control plane messages to physical layer devices having a radio frequency (RF) modulator for transmitting data in the DEPI traffic to a plurality of endpoints.

21. The non-transitory computer readable media of claim 19, wherein the instructions that multicast further comprise instructions, that when executed, cause the processor to multicast the DEPI traffic to a multicast group comprising a Data-Over-Cable Service Interface Specification (DOCSIS) Service Group.

* * * * *